(12) United States Patent
Crawford et al.

(10) Patent No.: US 8,135,572 B2
(45) Date of Patent: Mar. 13, 2012

(54) INTEGRATED DEBUGGER SIMULATOR

(75) Inventors: Brian R. Crawford, Seattle, WA (US);
Paul Matthew Pietrek, Issaquah, WA (US); Steven Steiner, Seattle, WA (US);
James P. Griesmer, Monroe, WA (US)

(73) Assignee: Microsoft Corporation, Redmond, WA (US)

( * ) Notice: Subject to any disclaimer, the term of this patent is extended or adjusted under 35 U.S.C. 154(b) by 1099 days.

(21) Appl. No.: 11/656,605

(22) Filed: Jan. 23, 2007

(65) Prior Publication Data
US 2008/0177525 A1 Jul. 24, 2008

(51) Int. Cl.
G06F 9/45 (2006.01)

(52) U.S. Cl. ............................ 703/22; 717/124; 717/135

(58) Field of Classification Search .................... 703/13, 703/21, 22; 717/124, 127, 128, 135
See application file for complete search history.

(56) References Cited

U.S. PATENT DOCUMENTS

| | | | |
|---|---|---|---|
| 5,784,552 A * | 7/1998 | Bishop et al. ................... 714/38 |
| 5,970,248 A | 10/1999 | Meier | |
| 6,154,856 A | 11/2000 | Madduri et al. | |
| 6,282,701 B1 | 8/2001 | Wygodny et al. | |
| 6,353,924 B1 | 3/2002 | Ayers et al. | |
| 6,789,216 B2 | 9/2004 | Zagorski et al. | |
| 6,804,814 B1 | 10/2004 | Ayers et al. | |
| 6,901,581 B1 | 5/2005 | Schneider | |
| 6,961,925 B2 | 11/2005 | Callahan, II et al. | |
| 7,131,115 B2 | 10/2006 | Hundt et al. | |
| 7,653,899 B1 * | 1/2010 | Lindahl et al. ................. 717/128 |
| 2002/0174415 A1 * | 11/2002 | Hines ............................ 717/127 |
| 2003/0226135 A1 | 12/2003 | Sethi et al. | |
| 2005/0251794 A1 * | 11/2005 | Taylor et al. ................... 717/148 |
| 2006/0101405 A1 | 5/2006 | Buschardt et al. | |

OTHER PUBLICATIONS

Microsoft Corporation, "Debugging Custom Microsoft Windows CE 3.0-based Systems", Apr. 2000, retrieved on May 25, 2010 from http://msdn.microsoft.com/en-us/library/ms834375.aspx.*
Prashant Sridharan, "Visual C# .NET 2003 IDE Changes", Jan. 2003, retrieved on May 25, 2010 from http://msdn.microsoft.com/en-us/library/aa289526(VS.71).aspx.*
Gabriela Jacques da Silva et al., "JRastro: A Trace Agent for Debugging Multithreaded and Distributed Java Programs", 2003, IEEE, Proc. 15th Symp. on Comp. Architecture and High Perf. Computing, pp. 1-9.*
"Debugging Backwards in Time", http://www.lambdacs.com/debugger/Article.html, 2002.
Bhansali, et al., "Framework for Instruction-level Tracing and Analysis of Program Executions", Date: 2006, http://research.microsoft.com/manuvir/papers/instruction level tracing VEE06.pdf.

(Continued)

Primary Examiner — Mary C Jacob (57) ABSTRACT

Various technologies and techniques are disclosed that provide an integrated debugger simulator. A debugger is provided that allows a user to debug an application in a live mode. A simulator is provided to read recorded data from an earlier point in time in an execution of the application. An integrated debugger simulator is provided by multiplexing the debugger between the application in the live mode and the simulator that reads the recorded data. A simulation mode is provided to allow the user to interact with the recorded data using the debugger. In this simulation mode, the user is able to interact with the recorded data using commands and data views available in the debugger. The user can multiplex between the live mode and the simulation mode from within the debugger.

16 Claims, 12 Drawing Sheets

OTHER PUBLICATIONS

Narayanasamy, et al., "BugNet: Continuously Recording Program Execution for Deterministic Replay Debugging", Jun. 2005, http://www-cse.ucsd.edu/users/gpokam/ISCA-05-BugNet.pdf.

Xu, et al., A "Flight Data Recorder" for Enabling Full-system Multiprocessor Deterministic Replay", Date: Jun. 9-11, 2003, http://www.cs.wisc.edu/multifacet/papers/isca03 flight data recorder.pdf.

"AVIcode Reaches New Heights", retrieved Sep. 1, 2010 from www.avicode.com/default.htm, 1 page.

"BMC AppSight—Eliminate the need to reproduce a problem in order to pinpoint its root cause", retrieved Sep. 1, 2010 from www.bmc.com/products/product-listing/BMC-Appsight.html?cmp=redirect_appsight, 1 page.

Lewis, "Omniscient Debugging", Date: Feb. 18, 2007, retrieved Sep. 1, 2010 from www.lambdacs.com/debugger/debugger.html, 4 pages.

* cited by examiner

EXAMPLE CALL TREE  330

Id  Event
1   Process creation
2   Thread creation
3   Code load
4   Function enter (function-id = main)
5   Statement execution (statement-id = 2)
6   Statement execution (statement-id = 3)
7   Statement execution (statement-id = 4)
8   Statement execution (statement-id = 5)
9    Function enter (function-id = Add)
10   Statement execution (statement-id = 9)
11   Statement execution (statement-id = 10)
12   Function exit (function-id = Add)
13  Statement execution (statement-id = 5)
14  Function exit (function-id = main)

EXAMPLE RECORDING 370

| Id | Event | Data |
|---|---|---|
| 1 | Process creation | process-id = 36 |
| 2 | Thread creation | thread-id = 8 |
| 3 | Code load | code-id = program.exe |
| 4 | Function enter | function-id = main; arguments = {"arg1", "arg2"} |
| 5 | Statement execution | statement-id = 2 |
| 6 | Statement execution | statement-id = 3; x = 1 |
| 7 | Statement execution | statement-id = 4; y = 2 |
| 8 | Statement execution | statement-id = 5; result = <unassigned>; x = 1; y = 2 |
| 9 | Function enter | function-id = Add; x = 1; y = 2 |
| 10 | Statement execution | statement-id = 9 |
| 11 | Statement execution | statement-id = 10; x = 1; y = 2 |
| 12 | Function exit | function-id = Add; return-value = 3 |
| 13 | Statement execution | statement-id = 5; result = 3; x = 1; y = 2 |
| 14 | Function exit | function-id = main |

FIG. 10

SCRIBBLE (DEBUGGING)                                                              400

FILE  EDIT  VIEW  PROJECT  BUILD  DEBUG  TOOLS  WINDOW  COMMUNITY  HELP

SCRIBBLEVIEW.CS

```
        THIS.CAPTURE = FALSE; }
        CATCH (EXCEPTION EX) {
            MESSAGEBOX.SHOW (EX.TOSTRING()) ;
    PRIVATE VOID PAINTHANDLER (OBJECT SENDER, PAINTEVENTARGS E)
        RECTANGLE RECTCLIP = E.CLIPRECTANGLE;
        RECTCLIP.INFLATE (1,1);
        RECTANGLE RECTSTROKE;
        FOR (INT I=0; I <MYDOC.STROKELIST.COUNT; I++)
        {
                    STROKE ST = (STROKE)MYDOC.STROKELIST [I];
```

< 3 OF 4 >
RECTSTROKE {X=150 Y=132 WIDTH = 42 HEIGHT =25} RECTANGLE ();
GETBOUNDINGRECTANGLE ()

402
404

LOCALS

| NAME | VALUE | TYPE | LANG |
|---|---|---|---|
| ⊞ ⊙ THIS | {SCRIBBLE.SCRIBBLEVIEW...} | SCRIBBLE... | |
| ⊞ ⊙ SENDER | {SCRIBBLE.SCRIBBLEVIEW, TEXT; | OBJECT S... | |
| ⊞ ⊙ RECTSTROKE | {X=117 Y=67 WIDTH=79 HEIGHT=95} | | |

CALL STACK

| NAME | | |
|---|---|---|
| ↑ | SCRIBBLE.EXE!SCRIBBLE.SCRIBBLEVIEW. PAINT HANDLER (OBJECT SENDER= VIEW,TEXT:SCRSCRL) | |
| | SCRIBBLE.EXE!SCRIBBLE.MAINWINDOW | |

FIG. 11

SCRIBBLE (DEBUGGING)

FILE  EDIT  VIEW  PROJECT  BUILD  DEBUG  TOOLS  WINDOW  COMMUNITY  HELP

|SCRIBBLE|

```
PUBLIC VOID FINISHSTROKE ()
    // CALCULATE THE BOUNDING RECTANGLE. IT'S NEEDED FOR SMART
    // REPAINTING
    IF (POINTARRAY.COUNT==0)
        BOUNDINGRECT.SIZE = SIZE.EMPTY;
        RETURN;
    POINT PT = {POINT} POINTARRAY [0];
    BOUNDINGRECT = NEW RECTANGLE (PT.X, PT.Y, 0, 0);
    FOR (INT I=1; I < POINTARRAY.COUNT; I++)
        // IF THE POINT LIES OUTSIDE OF THE ACCUMULATED BOUNDING
        // RECTANGLE, THEN INFLATE THE BOUNDING RECT TO INCLUDE IT.
        BOUNDINGRECT=RECTANGLE.FROMLTRB (MIN (BOUNDINGREC.LEFT, MAX (PT.X,PT.Y)),MIN (B0...
    //ADD THE PEN WIDTH TO THE BOUNDING RECTANGLE. THIS IS NECESSARY
    //TO ACCOUNT FOR THE WIDTH OF THE STROKE WHEN INVALIDATING
```

— 410

← 416

LOCALS

| NAME | VALUE | TYPE |
|---|---|---|
| THIS | {SCRIBBLE.STROKE} | SCRIBBLE.STROK |
| I | 14 | INT |
| PT | {X=225 Y = 106} | SYSTEM.D |

EXECUTION HISTORY

| EVENT | TIME |
|---|---|
| SCRIBBLE.MOUSEUPHAN... | 005.0000000400 |
| MODULE LOAD: C:\WINDOWS... | 005.0000000401 |
| SCRIBBLE.STROKE.FINISH... | 005.0000000402 |
| BOUNDINGRECT {X=0 Y=52... | 005.0000000415 |

INTEGRATED DEBUGGER SIMULATOR

BACKGROUND

There are several debugger applications that exist today for allowing developers to debug software applications. There are also several recording applications that allow developers to play back events that were recorded from an earlier execution of the software application. Some of such recording applications present users with lists of recorded events. Users often must select an event one by one in order to view the details associated with the selected event. This process of selecting each event one by one is very tedious and does not provide a big picture of what really happened. Other recording applications present users with a simplified debugger-like view where the user can more easily navigate from event to event using commands that feel more like those present in a debugger. However, such recording applications are merely playing back the data and do not have any real debugging capabilities.

SUMMARY

Various technologies and techniques are disclosed that provide an integrated debugger simulator. A debugger is provided that allows a user to debug an application in a live mode. A simulator is provided to read recorded data from an earlier point in time in an execution of the application. An integrated debugger simulator is provided by multiplexing the debugger between the application in the live mode and the simulator that reads the recorded data. A simulation mode is provided to allow the user to interact with the recorded data using the debugger. In this simulation mode, the user is able to interact with the recorded data using commands and data views available in the debugger. The user can multiplex between the live mode and the simulation mode from within the debugger. In one implementation, the user can be in both live mode and simulation mode concurrently.

This Summary was provided to introduce a selection of concepts in a simplified form that are further described below in the Detailed Description. This Summary is not intended to identify key features or essential features of the claimed subject matter, nor is it intended to be used as an aid in determining the scope of the claimed subject matter.

DETAILED DESCRIPTION

For the purposes of promoting an understanding of the principles of the invention, reference will now be made to the embodiments illustrated in the drawings and specific language will be used to describe the same. It will nevertheless be understood that no limitation of the scope is thereby intended. Any alterations and further modifications in the described embodiments, and any further applications of the principles as described herein are contemplated as would normally occur to one skilled in the art.

The system may be described in the general context as an application that provides debugging and simulation capabilities, but the system also serves other purposes in addition to these. In one implementation, one or more of the techniques described herein can be implemented as features within a software development program such as MICROSOFT® VISUAL STUDIO®, or from any other type of program or service that allows for creation, debugging, and/or simulation of applications.

In one implementation, the system integrates live debugging with historical debugging (e.g. an application simulator) where the user can debug and view an earlier point in time in the execution of the application at the same time. There are various types of operations that become available because of the integration, such as paths historically taken through functions, the history of program data within functions, and/or the tracking of data across functions throughout the program. In another implementation, the system provides technologies and techniques for providing the integration of live debugging and historical debugging.

Figure 1:
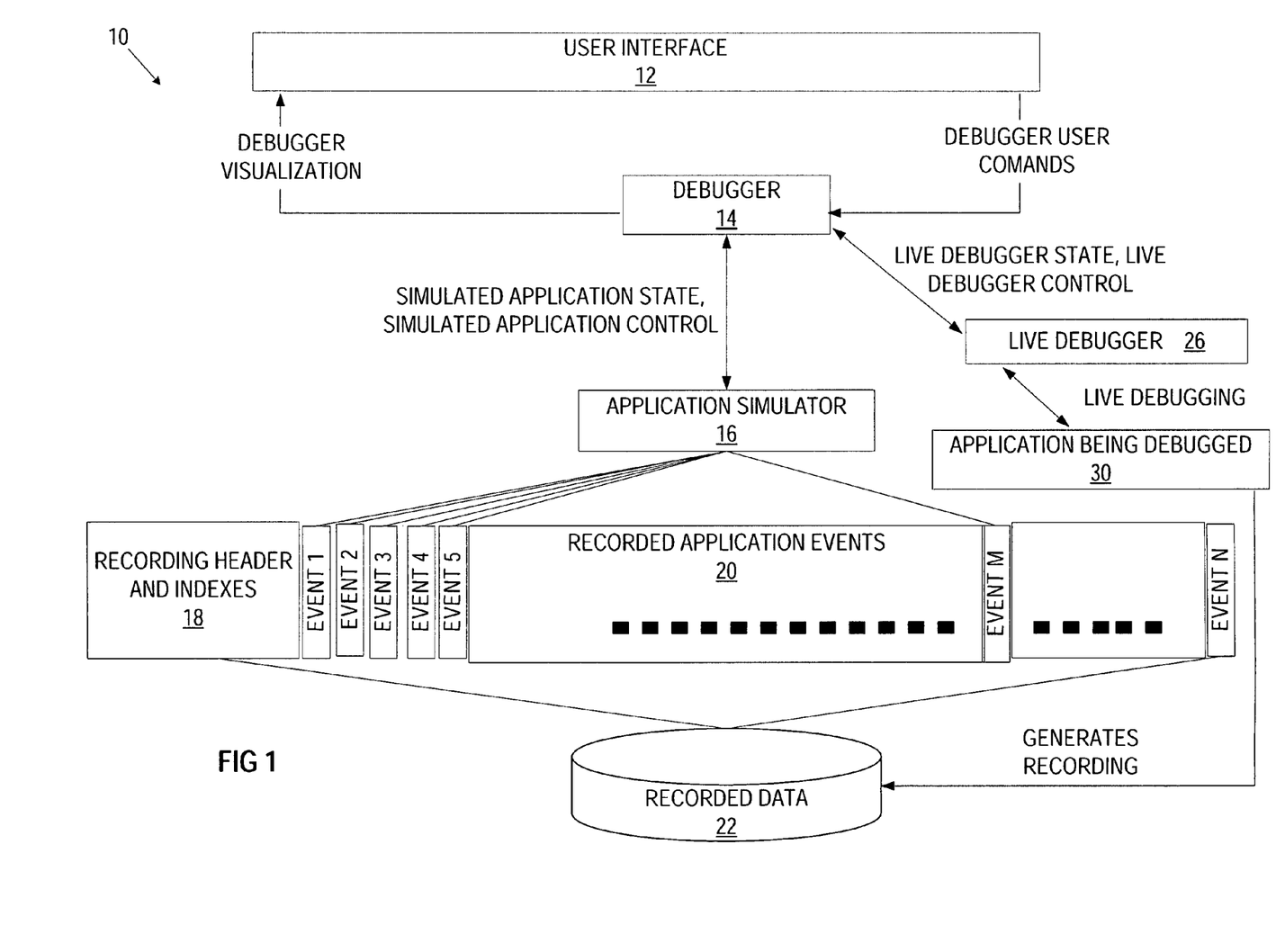
FIG. 1 is a diagrammatic view of an integrated debugger simulator application of one implementation.

FIG. 1 is a system 10 of one implementation that provides an integrated debugger simulator. In one implementation, the integrated debugger simulator allows a user to debug a live application and view recorded data from an earlier point in execution of that application from within the same user interface 12, and optionally at the same time (e.g. by viewing live and recorded data concurrently). Thus, the debugger is multiplexed between the live execution of the application and the simulation of the recorded data. The term multiplex as used herein means to interleave different activities, such as concurrently with each other and/or separately from each other.

The user interface of the integrated debugger simulator 12 is fed the data it displays from the debugger 14, the application simulator 16, and the live debugger 26. The debugger 14 is responsible for debugger visualization and debugger user commands for the live application execution (e.g. live mode) and for the simulated application state and simulated application control provided by the application simulator (e.g. simulation mode) 16. The application simulator 16 manages the recorded data, which can include information such as recording header and indexes 18, recorded application events 20, and/or other recorded details. This recorded information is gathered from recorded data 22 which was provided from application being debugged 30 from an earlier point in time in an execution of the application. This data includes data that was recorded from an earlier point in time in the current execution of the application, and/or from a prior execution of the application. Various technologies and techniques that help integrate these debugger and simulator features together are described in further detail in FIGS. 2-12.

Figure 2:
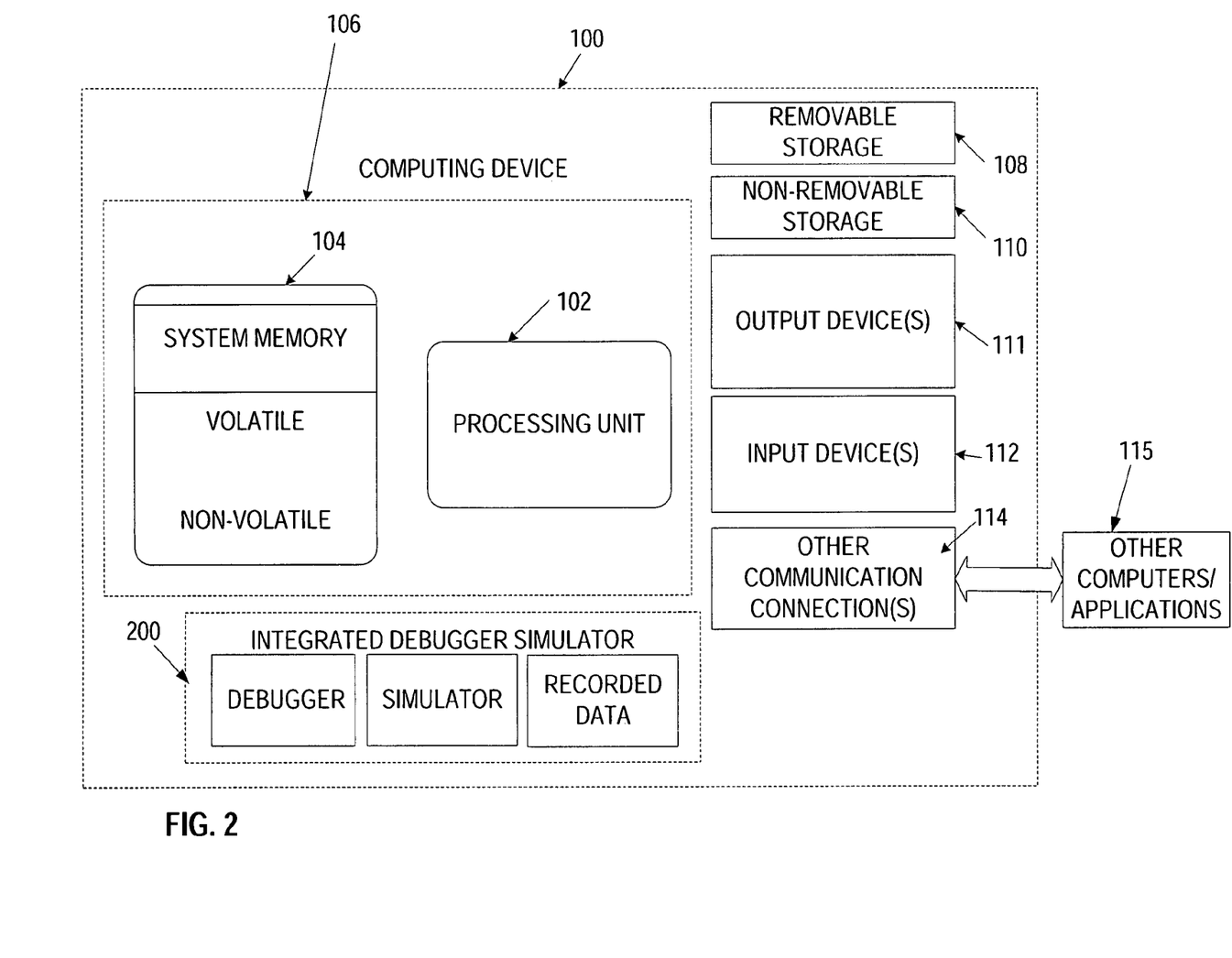
FIG. 2 is a diagrammatic view of a computer system of one implementation.

Turning now to FIG. 2, an exemplary computer system to use for implementing one or more parts of the system 10 includes a computing device, such as computing device 100. In its most basic configuration, computing device 100 typically includes at least one processing unit 102 and memory 104. Depending on the exact configuration and type of computing device, memory 104 may be volatile (such as RAM), non-volatile (such as ROM, flash memory, etc.) or some combination of the two. This most basic configuration is illustrated in FIG. 2 by dashed line 106.

Additionally, device 100 may also have additional features/functionality. For example, device 100 may also include additional storage (removable and/or non-removable) including, but not limited to, magnetic or optical disks or tape. Such additional storage is illustrated in FIG. 2 by removable storage 108 and non-removable storage 110. Computer storage media includes volatile and nonvolatile, removable and non-removable media implemented in any method or technology for storage of information such as computer readable instructions, data structures, program modules or other data. Memory 104, removable storage 108 and non-removable storage 110 are all examples of computer storage media. Computer storage media includes, but is not limited to, RAM, ROM, EEPROM, flash memory or other memory technology, CD-ROM, digital versatile disks (DVD) or other optical storage, magnetic cassettes, magnetic tape, magnetic disk storage or other magnetic storage devices, or any other medium which can be used to store the desired information and which can accessed by device 100. Any such computer storage media may be part of device 100.

Computing device 100 includes one or more communication connections 114 that allow computing device 100 to communicate with other computers/applications 115. Device 100 may also have input device(s) 112 such as keyboard, mouse, pen, voice input device, touch input device, etc. Output device(s) 111 such as a display, speakers, printer, etc. may also be included. These devices are well known in the art and need not be discussed at length here. In one implementation, computing device 100 includes integrated debugger simulator application 200. Integrated debugger simulator application 200 will be described in further detail in FIG. 3.

Figure 3:
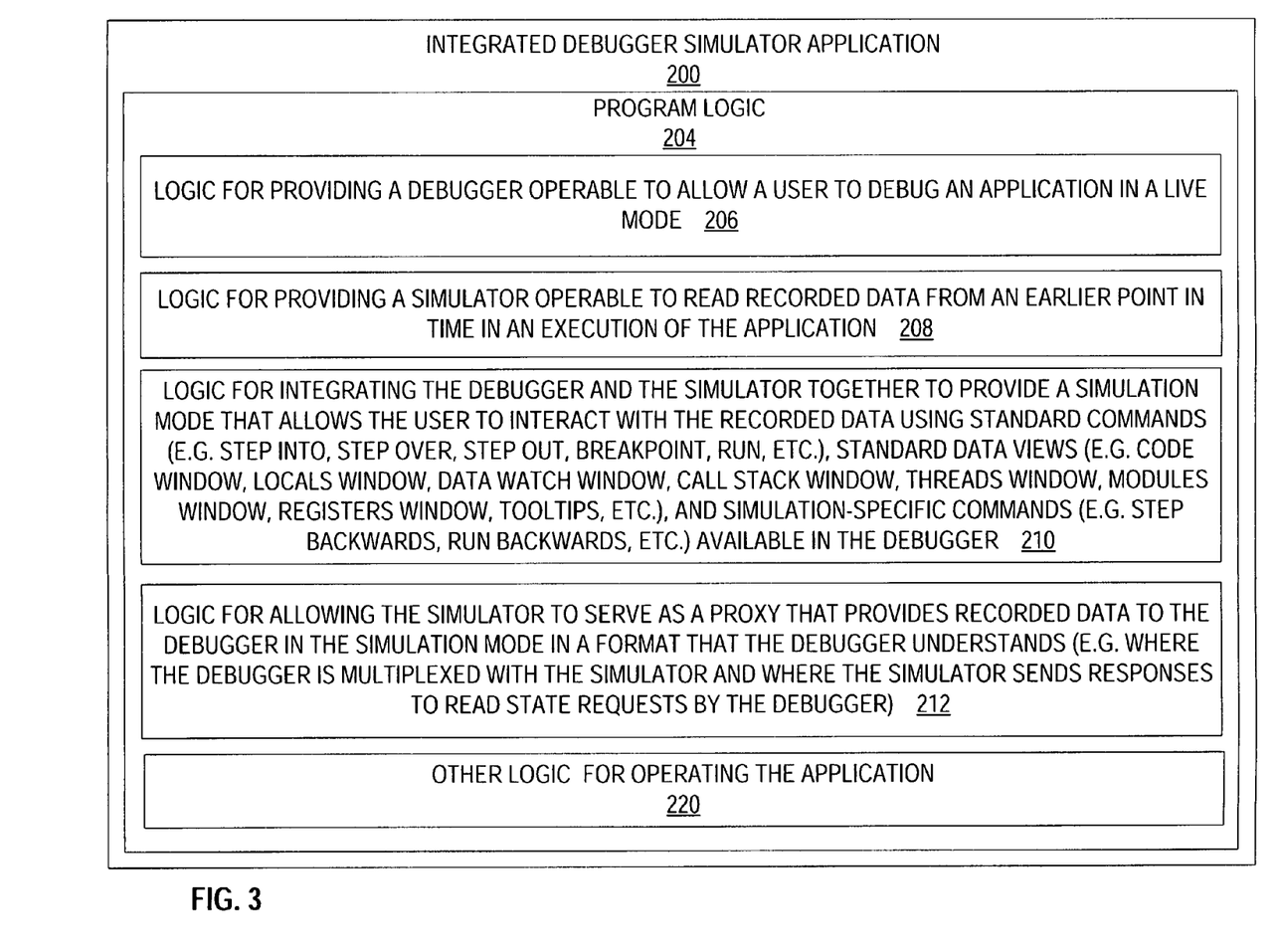
FIG. 3 is a diagrammatic view of an integrated debugger simulator application of FIG. 1 operating on the computer system of FIG. 2.

Turning now to FIG. 3 with continued reference to FIG. 2, an integrated debugger simulator application 200 operating on computing device 100 is illustrated. Integrated debugger simulator application 200 is one of the application programs that reside on computing device 100. However, it will be understood that integrated debugger simulator application 200 can alternatively or additionally be embodied as computer-executable instructions on one or more computers and/or in different variations than shown on FIG. 2. Alternatively or additionally, one or more parts of integrated debugger simulator application 200 can be part of system memory 104, on other computers and/or applications 115, or other such variations as would occur to one in the computer software art.

Integrated debugger simulator application 200 includes program logic 204, which is responsible for carrying out some or all of the techniques described herein. Program logic 204 includes logic for providing a debugger operable to allow a user to debug an application in a live mode 206; logic for providing a simulator operable to read recorded data from an earlier point in time in an execution of the application 208; logic for integrating the debugger and the simulator together to provide a simulation mode that allows the user to interact with the recorded data using standard commands (e.g. step into, step over, step out, breakpoint, run, etc.), standard data views (e.g. code window, locals window, data watch window, call stack window, threads window, modules window, registers window, tooltips, etc.), and simulation-specific commands (e.g. step backwards, run backwards, etc.) available in the debugger 210; logic for allowing the simulator to serve as a proxy that provides recorded data to the debugger in the simulation mode in a format that the debugger understands (e.g. where the debugger is multiplexed with the simulator and where the simulator sends responses to read state requests by the debugger) 212; and other logic for operating the application 220. In one implementation, program logic 204 is operable to be called programmatically from another program, such as using a single call to a procedure in program logic 204.

Figure 4:
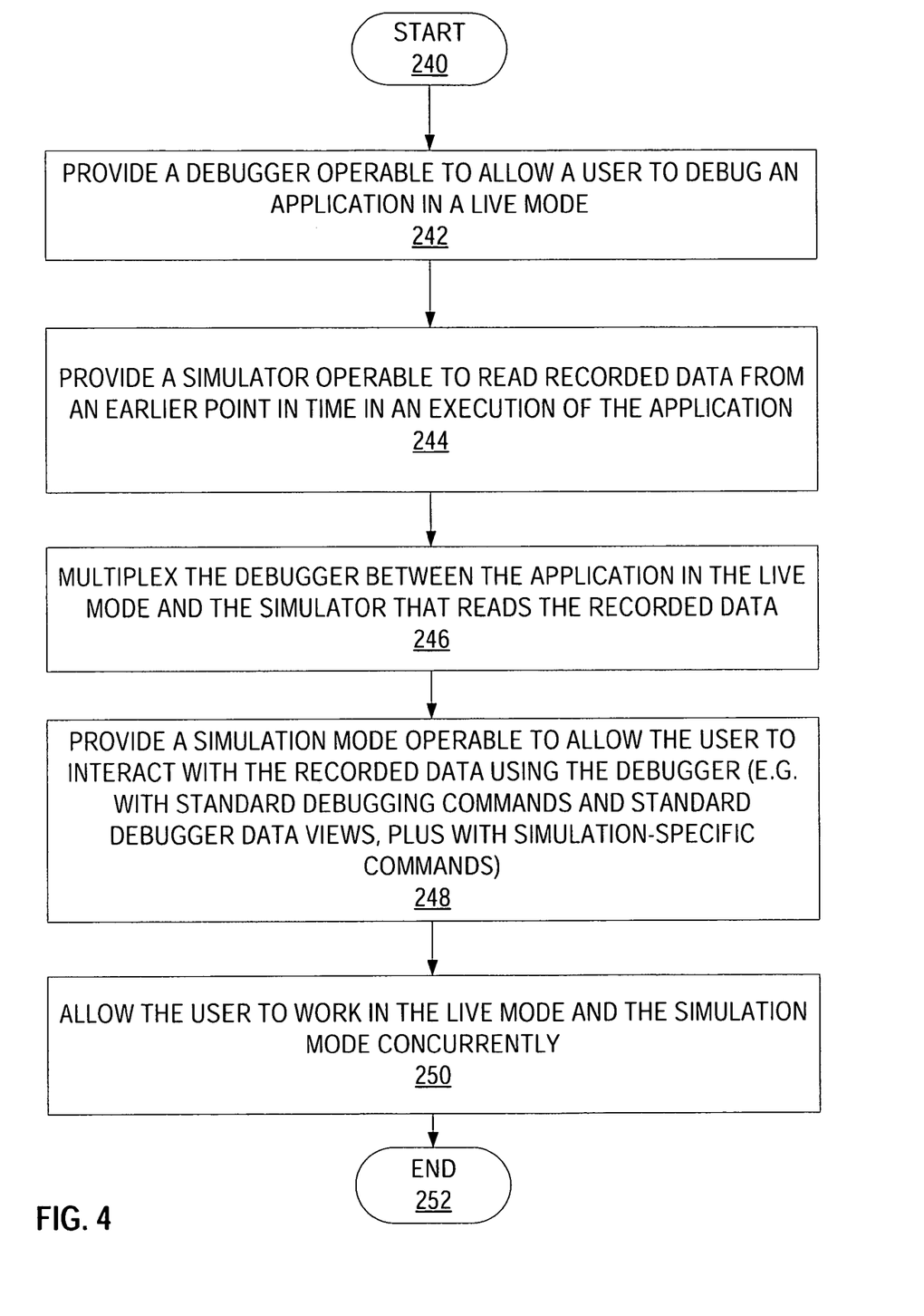
FIG. 4 is a high-level process flow diagram for one implementation of the system of FIG. 1.

Turning now to FIGS. 4-10 with continued reference to FIGS. 1-2, the stages for implementing one or more implementations of integrated debugger simulator application 200 are described in further detail. FIG. 4 is a high level process flow diagram for integrated debugger simulator application 200. In one form, the process of FIG. 4 is at least partially implemented in the operating logic of computing device 100. The procedure begins at start point 240 with providing a debugger operable to allow a user to debug an application in a live mode (stage 242). A simulator is provided that is operable to read recorded data from an earlier point in time in an execution of the application (stage 244). The debugger is multiplexed between the application in the live mode and the simulator that reads the recorded data (stage 246). A simulation mode is provided that is operable to allow the user to interact with the recorded data using the debugger (e.g. with standard debugging commands and standard debugger data views, plus with simulation-specific commands (stage 248). The user is allowed to work in the live mode and the simulation mode concurrently (stage 250). In one implementation, the user can also play back multiple recording streams simultaneously (in addition to just a single recording), possibly collected on different computers. The process ends at end point 252.

Figure 5:
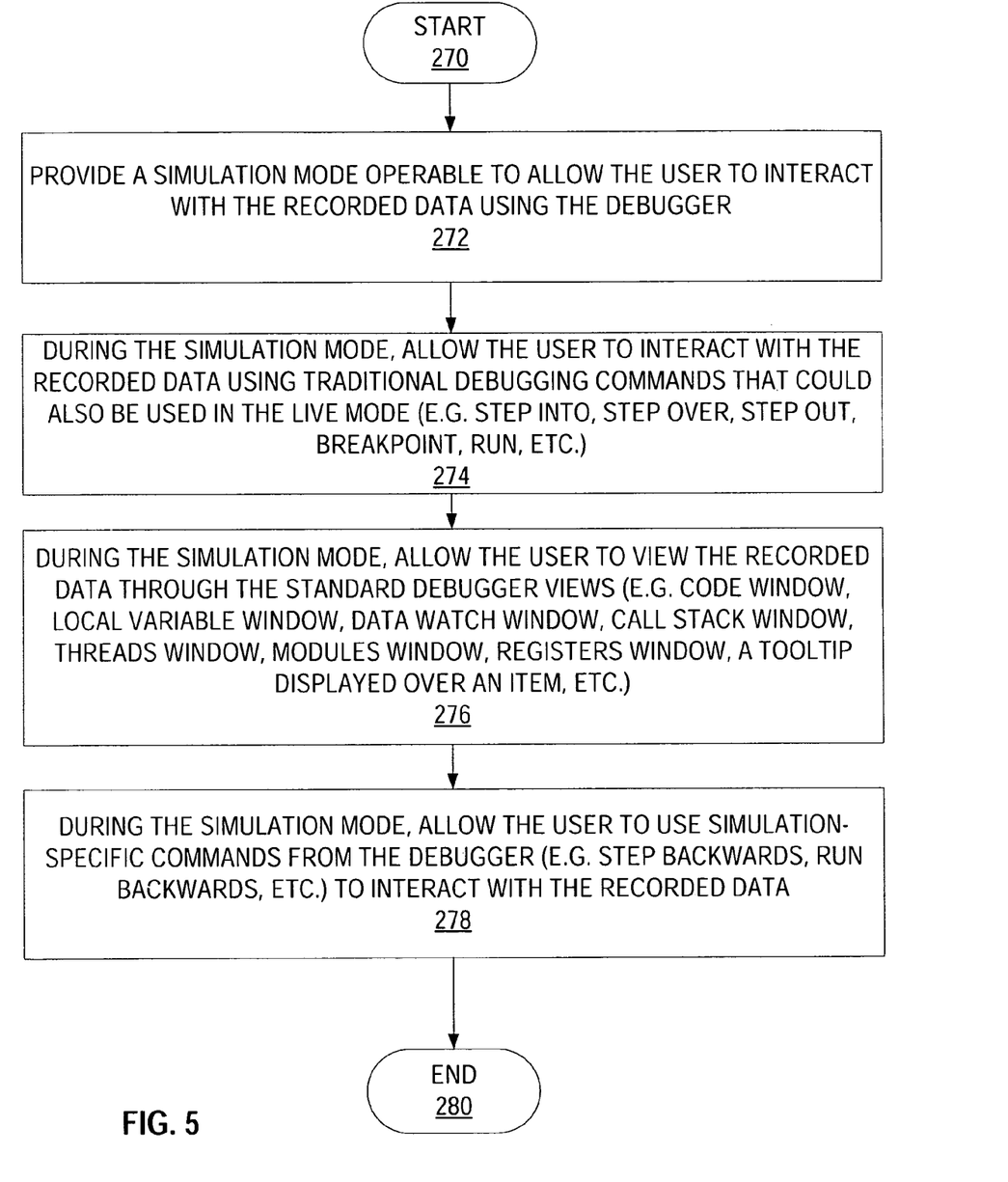
FIG. 5 is a process flow diagram that illustrates one implementation of the stages involved in providing a simulation mode to allow the user to interact with recorded data using the debugger

FIG. 5 illustrates one implementation of the stages involved in providing a simulation mode to allow the user to interact with recorded data using the debugger. In one form, the process of FIG. 5 is at least partially implemented in the operating logic of computing device 100. The procedure begins at start point 270 with providing a simulation mode that is operable to allow the user to interact with the recorded data using the debugger (stage 272). During the simulation mode, the user is allowed to interact with the recorded data using traditional debugging commands that could also be used in the live mode (e.g. step into, step over, step out, breakpoint, run, etc.) (stage 274). During the simulation mode, the user is allowed to view the recorded data through the standard debugger views (stage 276). Some non-limiting examples of standard debugger views include a code window, local variable window, data watch window, call stack window, threads window, modules window, registers window, and/or a tooltip displayed over an item, etc. (stage 276). During the simulation mode, the user is allowed to use simulation-specific commands from the debugger (such as step backwards, run backwards, etc.) to interact with the recorded data (stage 278). The process ends at end point 280.

Figure 6:
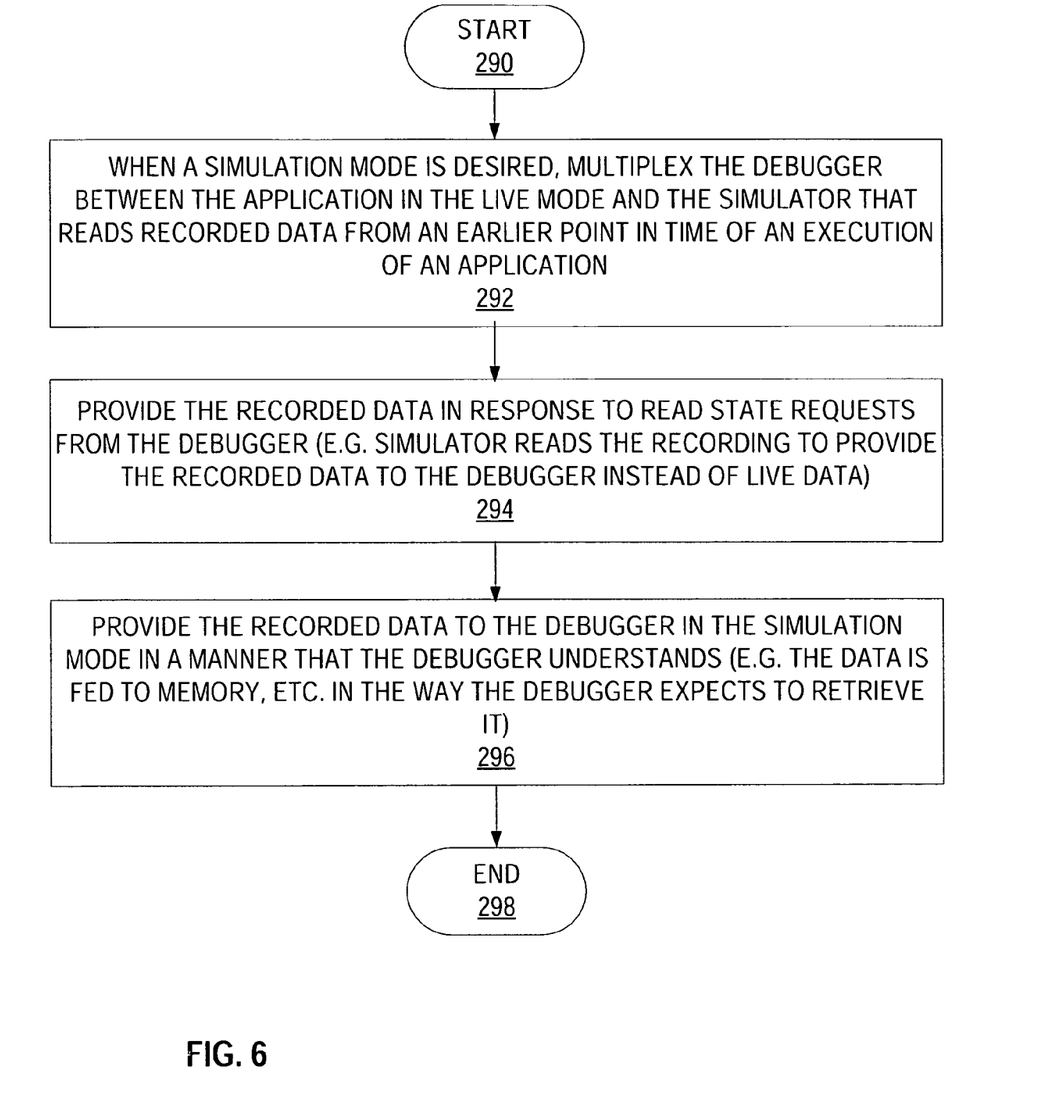
FIG. 6 is a process flow diagram that illustrates one implementation of the stages involved in multiplexing the debugger between the live application and the simulator.

FIG. 6 illustrates one implementation of the stages involved in multiplexing the debugger between the live application and the simulator. In one form, the process of FIG. 6 is at least partially implemented in the operating logic of computing device 100. The procedure begins at start point 290 when a simulation mode is desired (stage 292). The debugger is multiplexed between the application in the live mode and the simulator that reads the recorded data from an earlier point in time of an execution of an application (stage 292). Recorded data is provided in response to read state requests from the debugger (stage 294). In other words, the simulator reads the recording to provide the recorded data to the debugger instead of the live data (stage 294). The recorded data is provided to the debugger in the simulation mode in a manner that the debugger understands (e.g. the data is fed to memory or other locations in the way the debugger expects to retrieve it (stage 296). The process ends at end point 298.

Figure 7:
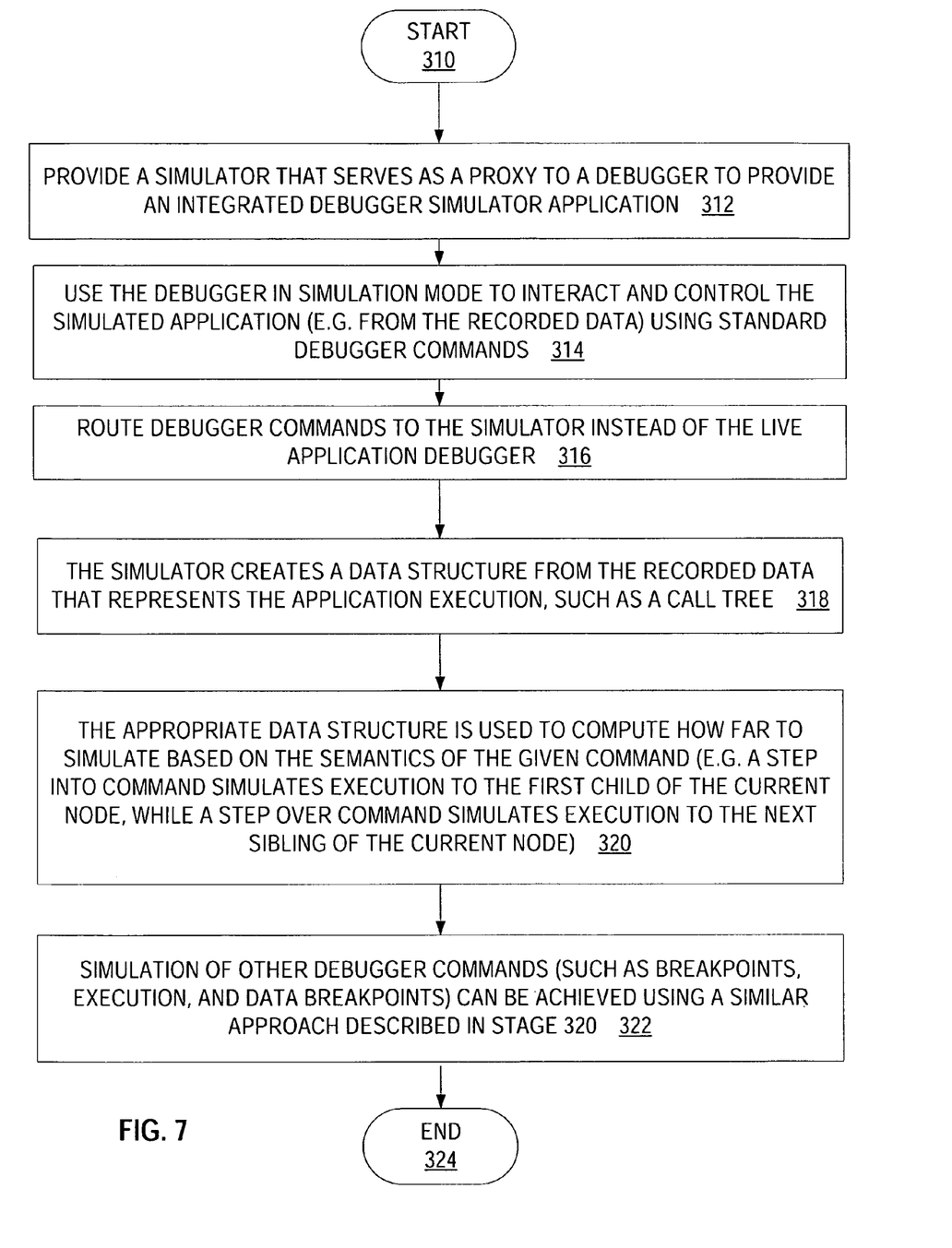
FIG. 7 is a process flow diagram that illustrates one implementation of the stages involved in providing a simulator that serves as a proxy to a debugger.

FIG. 7 illustrates one implementation of the stages involved in providing a simulator that serves as a proxy to a debugger. In one form, the process of FIG. 7 is at least partially implemented in the operating logic of computing device 100. The procedure begins at start point 310 with providing a simulator that serves as a proxy to a debugger to provide an integrated debugger simulator application (stage 312). The debugger is used in simulation mode to interact and control the simulated application (e.g. from the recorded data) using standard debugger commands (stage 314). The debugger commands are routed to the simulator instead of the live application debugger (stage 316). The simulator creates a data structure from the recorded data that represents the application execution, such as a call tree (stage 318).

Figure 8:
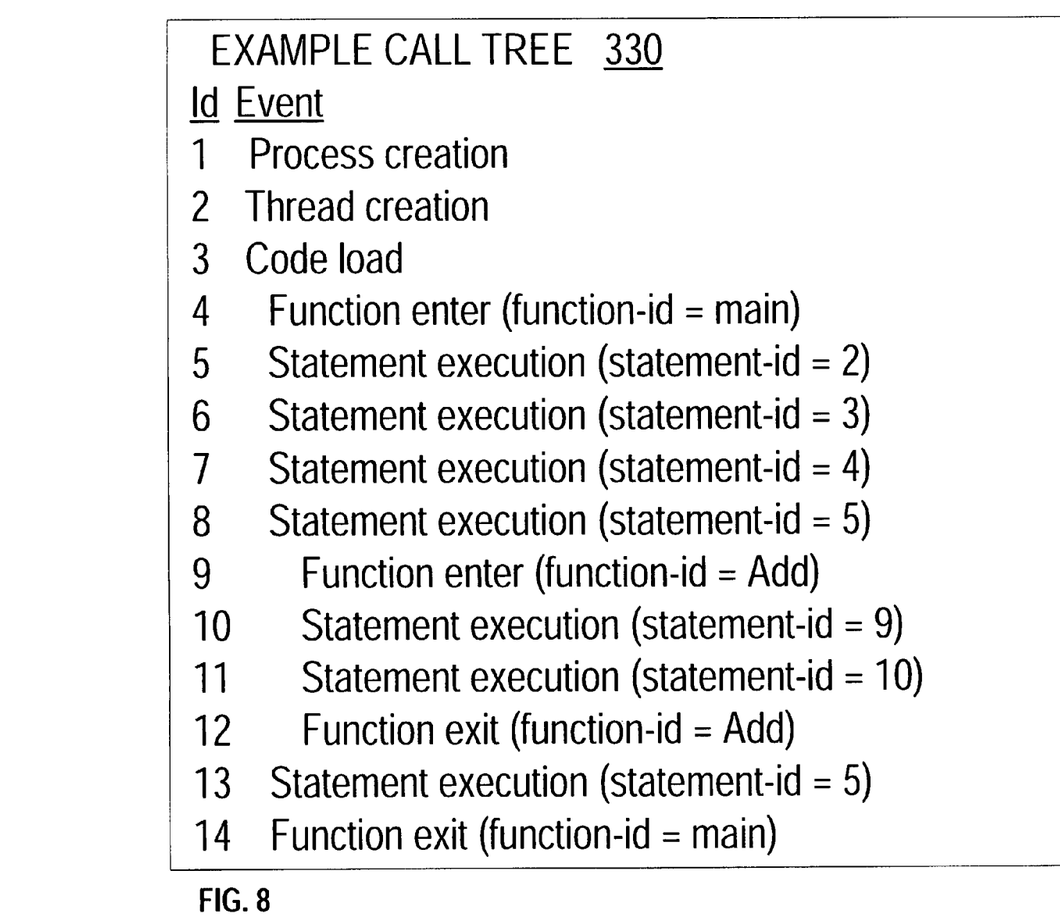
FIG. 8 is a diagram of an exemplary call tree of one implementation.

As illustrated in the call tree diagram 330 shown in FIG. 8, in the case of a call tree, each node can represent one event from the recording, sibling nodes can represent events that occur in the same function, and child nodes can represent events that occur within a function, or another suitable way of representing can be used (stage 318). Returning to FIG. 7, the appropriate data structure is used to compute how far to simulate based on the semantics of the given command (e.g. a step into command simulates execution of the first child of the current node, while a step over command simulates execution of the next sibling of the current node (stage 320). Simulation of other debugger commands (such as breakpoints, execution, and data breakpoints) can be achieved using a similar approach as described in stage 320 (stage 322). The process ends at end point 324.

Figure 9:
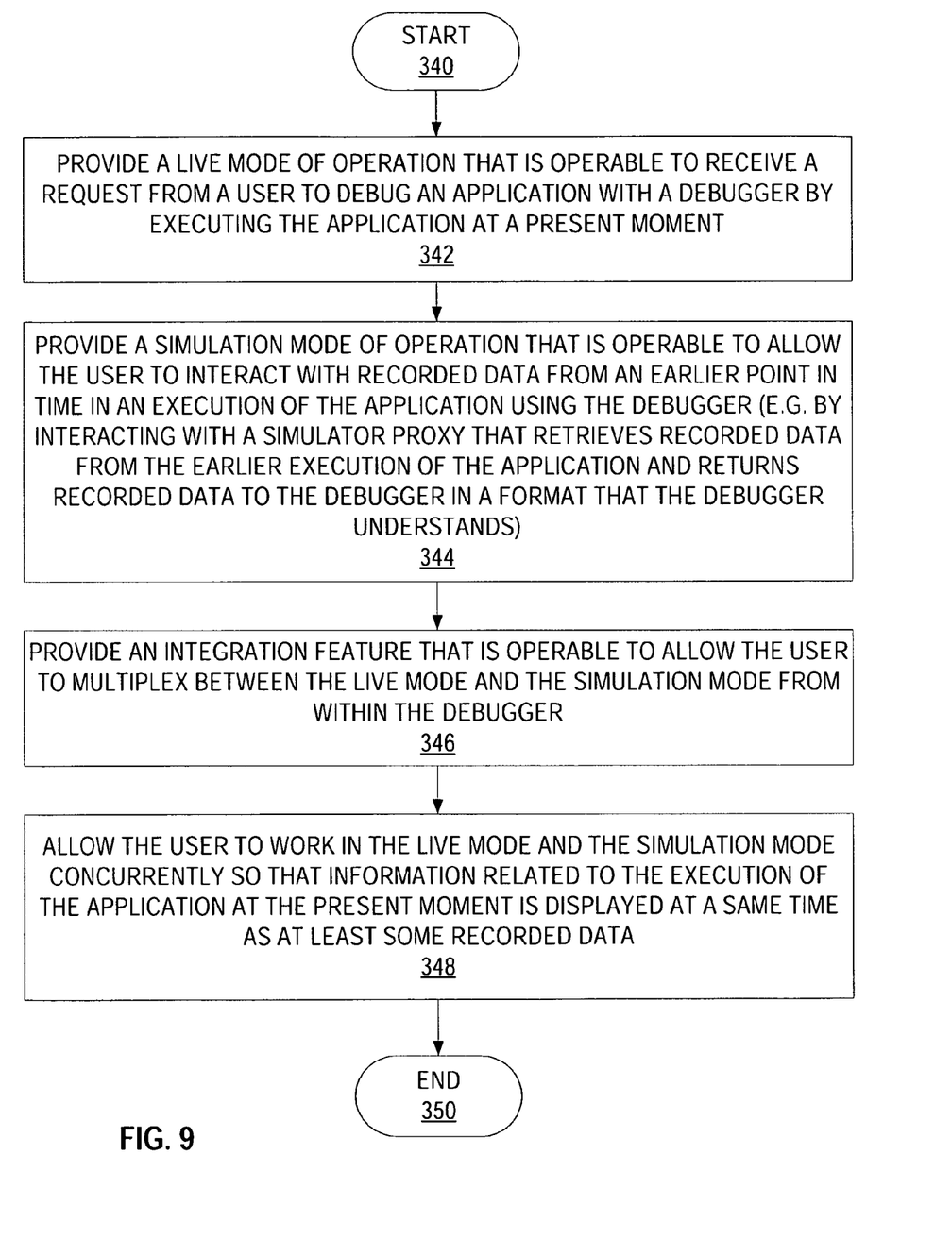
FIG. 9 is a process flow diagram that illustrates one implementation of the stages involved in allowing a user to multiplex between a live mode and a simulation mode using a debugger.

FIG. 9 illustrates one implementation of the stages involved in allowing a user to multiplex between a live mode and a simulation mode using a debugger. In one form, the process of FIG. 9 is at least partially implemented in the operating logic of computing device 100. The procedure begins at start point 340 with providing a live mode of operation that is operable to receive a request from a user to debug an application with a debugger by executing the application at a present moment (stage 342). A simulation mode of operation is provided that is operable to allow the user to interact with recorded data from an earlier point in time in an execution of the application using the debugger (stage 344). In one implementation, the simulation mode is provided by interacting with a simulator proxy that retrieves recorded data from the earlier execution of the application and returns the recorded data to the debugger in a format that the debugger understands (stage 344).

An integration feature is provided that is operable to allow the user to multiplex between the live mode and the simulation mode from within the debugger (stage 346). The integration feature between a live debugger and a debugger simulator can be accomplished in many ways. As one non-limiting example, in a live debugger, a running process can be represented by a process object, a running thread by a thread object, a location on a call stack or in code by a location object, and piece of program data by a name, value pair. In a debugger simulator, the same types of objects can be used. Integrating a live debugger with a debugger simulator introduces the notion of time into the debugger, which can be represented by a "time context". Live debugging can be represented by setting the time context of the process to "now" and any previous time can be represented by setting the time context of the process to the time context of any previously recorded event from the application.

In order to integrate live debugging and a debugger simulator, a debugger could use the following process: To get data from the live debugger, set the process object's time context to "now" and retrieve the state of the application from the process and thread objects (location, call stacks, state of variable data, etc.). To get historical data, get a time context from a recorded application event, set the process object's time context to the time for that event, and retrieve the state of the application from the process and thread objects (location, call stacks, state of variable data, etc.) at that time.

The user is allowed to work in the live mode and the simulation mode concurrently so that information related to the execution of the application at the present moment is displayed at a same time as at least some recorded data (stage 348). In one implementation, to provide the new operations described above, the debugger uses the process above to get the application state for the live time context and the application state for the time context from each relevant recorded event. The relevant recorded events are determined by the operation desired. The assumption is that there is an existing mechanism for getting the relevant recorded events. For example, to get the paths through the current function, the relevant recorded events are the set of events recorded between the function enter event and the last recorded event. Using the data retrieved by running the above process, the debugger makes that information available to the user through views like shown in FIG. 11. The process ends at end point 350.

Figure 10:
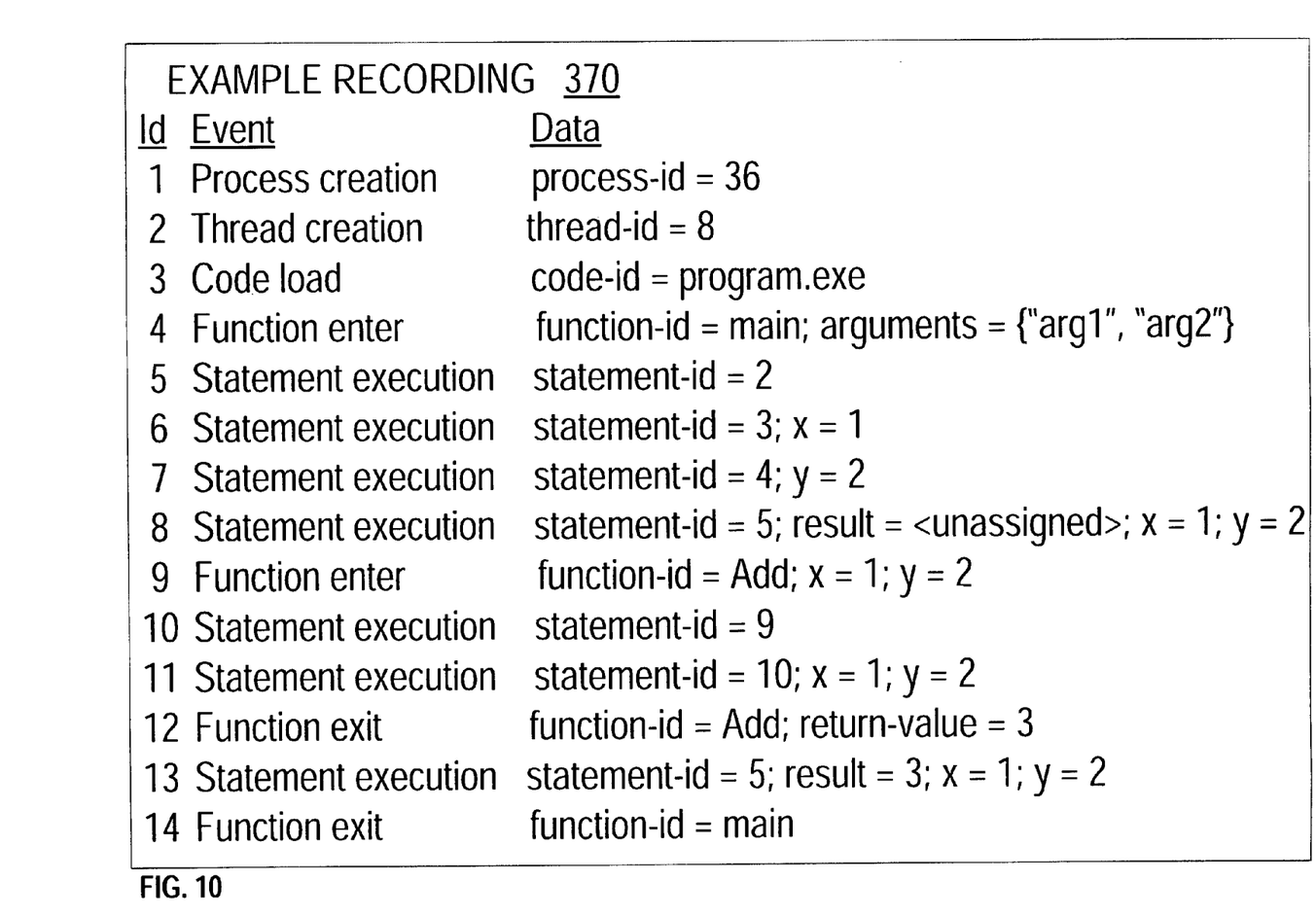
FIG. 10 is a diagram of one implementation illustrating some recorded data contained in a hypothetical recording file.

FIG. 10 is a diagram illustrating some recorded data contained in a hypothetical recording file 370. The example shows a list of events with details about the event and the data that resulted from the event. The example is merely illustrative, and numerous other ways for storing and/or representing recorded data could also be used.

Figure 11:
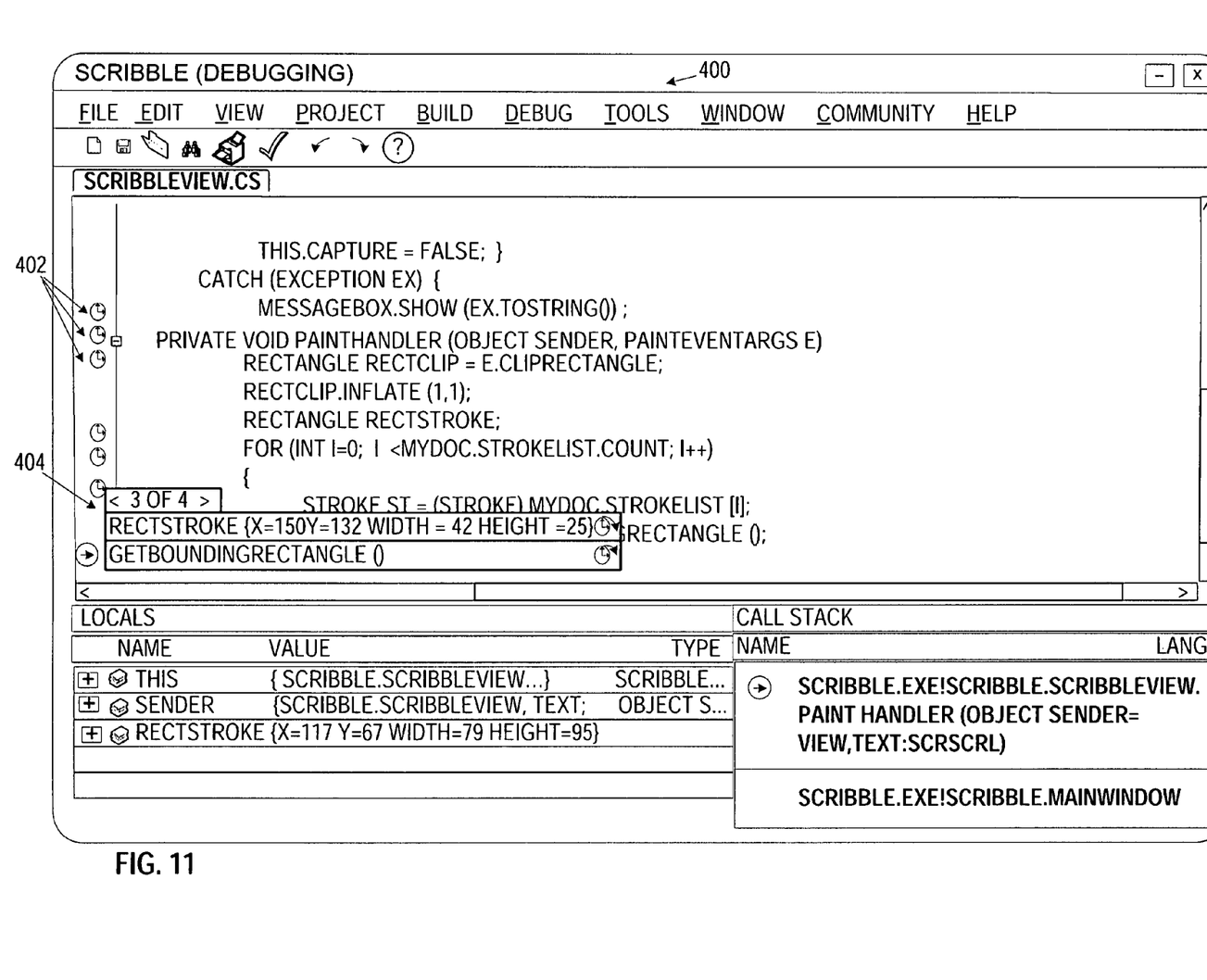
FIG. 11 is a simulated screen of one implementation that illustrates using a live mode concurrently with a simulation mode.
Figure 12:
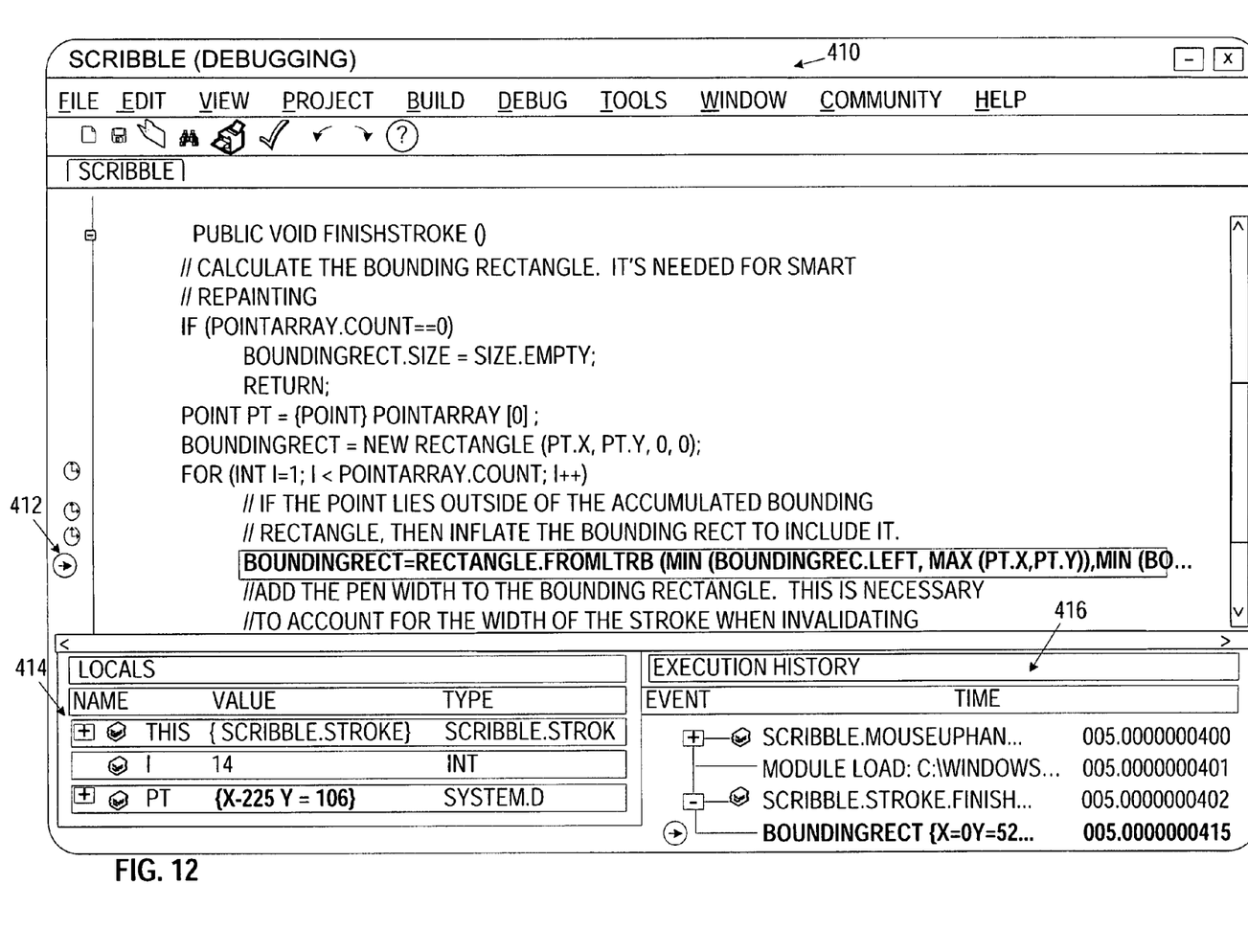
FIG. 12 is a simulated screen of one implementation that illustrates navigating from live debugging to a specific point in the recording.

Turning now to FIGS. 11-12, simulated screens are shown to illustrate a user interface that allows use of integrated debugger simulator application 200. These screens can be displayed to users on output device(s) 111. Furthermore, these screens can receive input from users from input device(s) 112.

FIG. 11 shows a simulated screen 400 of one implementation that illustrates using a live mode concurrently with a simulation mode. The user (e.g. the developer) is in the live debugging mode, but has access to application state from the recorded data from the simulator at each of points 402. These points 402 show the paths taken through the function and are displayed where the debugger is stopped. The user is able to examine the state of some of the application's data 404 at any point in the recording (while live debugging). In other words, the user can view both the current state of data from the live debugger as well as the history of that data 404 within the function. The user can track data across functions to identify the object and track its location through the program's lifetime in order to understand how a particular variable being examined in the live debugger got its value. For instance, the clock icon 402 means "this line has executed at least once in the current function invocation", while the "<3 of 4>" popup 404 means that you can inspect a variable's value at 4 different points in time.

FIG. 12 shows a simulated screen 410 of one implementation that illustrates navigating from live debugging to a specific point in the recording 412. By integrating the simulator with the debugger, the user is able to view the state of the application through the same debugger view (as when live debugging), such as locals window 414. Alternatively or additionally, richer views, like the historical call tree 416, can be provided directly in the debugger.

Although the subject matter has been described in language specific to structural features and/or methodological acts, it is to be understood that the subject matter defined in the appended claims is not necessarily limited to the specific features or acts described above. Rather, the specific features and acts described above are disclosed as example forms of implementing the claims. All equivalents, changes, and modifications that come within the spirit of the implementations as described herein and/or by the following claims are desired to be protected.

For example, a person of ordinary skill in the computer software art will recognize that the client and/or server arrangements, user interface screen content, and/or data layouts as described in the examples discussed herein could be organized differently on one or more computers to include fewer or additional options or features than as portrayed in the examples.

What is claimed is:

1. A method for providing simulation through a debugger comprising the steps of:
   providing a live debugger operable to allow a user to debug an application in a live mode;
   providing a simulator operable to read recorded data from an earlier point in time in an execution of the application;
   providing a simulation mode operable to allow the user to interact with the recorded data using the debugger;
   multiplexing the debugger between the application in the live mode and the simulator that reads the recorded data;
   simultaneously interacting with multiple streams of recorded data using the simulation mode, wherein the simulation mode allows the user to interact with the multiple streams of recorded data using debugging commands used in the live mode, the debugging commands are selected from the group consisting of a step into command, a step over command, a breakpoint command, a run command, and a step out command;
   concurrently displaying live debugger state associated with the live mode, and, simulated application state associated with the simulation mode of the multiple streams of recorded data, the live debugger state and the simulated application state displayed at a same time; and
   receiving a command from the user to interact with the recorded data.

2. The method of claim 1, further comprising:
   providing the recorded data from the simulator to the debugger in response to read state requests from the debugger.

3. The method of claim 1, wherein the simulation mode further allows the user to interact with the recorded data using simulation-specific commands.

4. The method of claim 3, wherein the simulation-specific commands are selected from the group consisting of a step backwards command and a run backwards command.

5. The method of claim 1, wherein the simulation mode allows the user to view the recorded data through debugger data views.

6. The method of claim 5, wherein the debugger data views are selected from the group consisting of a code window, a local variable window, a data watch window, a call stack window, a threads window, a modules window, a registers window, and a tooltip displayed over a particular item.

7. A computer-readable medium, the computer-readable medium not consisting of a propagating signal, the computer-readable medium having computer-executable instructions for causing a computer to perform the steps recited in claim 1.

8. A computer-readable medium, the computer-readable medium not consisting of a propagating signal, the computer-readable medium having computer-executable instructions for causing a computer to perform steps comprising:
   debugging an application using a live debugger to debug an application in a live mode;
   simultaneously simulating the application using a simulator that reads multiple streams of recorded data from earlier points in time in execution of the application; and
   integrating the live debugger and the simulator together to provide a simulation mode that allows the user to concurrently interact with the recorded data of the multiple streams of recorded data and the live mode using standard commands and standard data views available in the live debugger.

9. The computer-readable medium of claim 8, wherein the simulator sends responses to read state requests.

10. The computer-readable medium of claim 8, wherein the standard commands provided by the simulation mode are selected from the group consisting of a step into command, a step over command, a breakpoint command, a run command, and a step out command.

11. The computer-readable medium of claim 8, wherein the standard data views are selected from the group consisting of a code window, a locals window, a data watch window, a call stack window, a threads window, a modules window, a registers window, and a tooltip for a particular item.

12. A method for integrating simulation and live debugging of an application in a single debugger comprising the steps of:
   using a computing device, debugging an application in a live mode of operation based upon a request from a user to debug the application with a debugger by executing the application at a present moment;
   simulating the application in a simulation mode of operation based upon user interaction with recorded data of multiple streams of recorded data from an earlier in time in execution of the application using the debugger; and
   concurrently displaying live debugger state associated with the live mode, and, simulated application state associated with the simulation mode of the multiple streams of recorded data, the live debugger state and the simulated application state displayed at a same time.

13. The method of claim 12, wherein the simulation mode is provided to the user by interacting with a simulator proxy that retrieves recorded data from the earlier point in time in the execution of the application and returns the recorded data to the debugger in a format that the debugger understands.

14. The method of claim 12, wherein the live mode and the simulation mode operate concurrently so that information related to the execution of the application at the present moment is displayed concurrently with at least some recorded data from the earlier point in time in the execution of the application.

15. A computer-readable medium, the computer-readable medium not consisting of a propagating signal, the computer-readable medium having computer-executable instructions for causing a computer to perform the steps recited in claim 12.

16. The method of claim 12, further comprising simultaneously concurrently displaying simulated application state associated with recorded data from another earlier point in time in an execution of the application.

* * * * *

UNITED STATES PATENT AND TRADEMARK OFFICE
CERTIFICATE OF CORRECTION

| | | |
|---|---|---|
| PATENT NO. | : 8,135,572 B2 | |
| APPLICATION NO. | : 11/656605 | |
| DATED | : March 13, 2012 | |
| INVENTOR(S) | : Crawford et al. | |

It is certified that error appears in the above-identified patent and that said Letters Patent is hereby corrected as shown below:

In column 8, line 38, in Claim 12, after "earlier" insert -- point --.

Signed and Sealed this
Eighteenth Day of December, 2012

David J. Kappos
*Director of the United States Patent and Trademark Office*